United States Patent
Itoh et al.

(10) Patent No.: US 6,249,653 B1
(45) Date of Patent: *Jun. 19, 2001

(54) IMAGE RECORDING DEVICE HAVING A GROUND CONNECTOR

(75) Inventors: Hisanori Itoh, Sakai; Masatoshi Itoh, Takatsuki; Mitsuhiro Sugita, Gose, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,587

(22) Filed: Mar. 24, 1998

(30) Foreign Application Priority Data

Mar. 25, 1997 (JP) .................................... 9-071659

(51) Int. Cl.⁷ .................................... G03B 17/02
(52) U.S. Cl. .................... 396/535; 348/333.06; 348/373
(58) Field of Search .................... 396/529, 531, 396/532, 535, 542, 544, 299, 429, 423, 424, 425; 358/906, 909.1; 348/333, 373, 376, 333.01, 333.06, 333.07

(56) References Cited

U.S. PATENT DOCUMENTS

| | | | |
|---|---|---|---|
| 4,596,454 | 6/1986 | Kawai et al. | 396/532 |
| 4,682,871 | * 7/1987 | Metabi | 396/529 X |
| 4,864,348 | 9/1989 | Fujiwara et al. | 396/542 |
| 4,970,558 | * 11/1990 | Matsuda et al. | 396/529 |
| 5,442,453 | * 8/1995 | Takagi et al. | 358/906 |

FOREIGN PATENT DOCUMENTS 2-7593   1/1990   (JP) .

* cited by examiner

*Primary Examiner*—David M. Gray
(74) *Attorney, Agent, or Firm*—Burns, Doane, Swecker & Mathis, LLP

(57) ABSTRACT

Camera body and taking lens unit are constructed such that they may rotate relative to each other, and circuit board of connector to which taking lens unit is mounted and the electrical circuitry inside the camera body are connected by means of flexible circuit board. Further, the grounding line is strengthened by having reinforcing plate that is in electrical contact with detachable circuit board comprise a metal plate and by having metal plate connected with the grounding line of the camera body to move against reinforcing plate.

28 Claims, 4 Drawing Sheets

IMAGE RECORDING DEVICE HAVING A GROUND CONNECTOR

This application is based on application No. Hei 9-71659 filed in Japan, the content of which is hereby incorporated by reference.

BACKGROUND OF THE INVENTION

1. Field of the Invention

The present invention pertains to an image recording device in which a taking lens unit is rotatably supported by a camera body.

2. Description of the Prior Art

Conventionally, in this type of image recording device, in order to make the camera body and taking lens unit rotatable relative to each other, the two are normally connected electrically by means of a flexible circuit board. In other words, the flexible circuit board is placed in a linking space formed along the rotational axis inside the rotatable connecting unit connecting the camera body and the taking lens unit, and the ends of the flexible circuit board are fixed and electrically connected to circuit board fixed inside the camera body and taking lens unit, respectively.

However, in said conventional device, when the taking lens unit is made to rotate relative to the camera body, because both ends of the flexible circuit board are fixed to the other circuit boards, the area of the flexible circuit board near the rotatable connecting unit becomes twisted, so that the flat flexible circuit board becomes pulled along its lengthwise edges while the center part becomes compressed, which causes the printed circuitry and the substrate that supports it to become fatigued over time.

In view of this problem, the applicant formerly proposed a method to solve it by constructing the flexible circuit board that electrically connects the camera body and the taking lens unit such that it passes through a linking space that is created by means of the inside of the shaft member and the extension member and exits a notch member formed on the circumference of the extension member and linked to the linking space such that it then wraps around the circumference of the extension member.

In this case, when the taking lens unit is made to rotate, in order for the flexible circuit board to rotate together with the shaft member and the extension member inside the shaft member and the extension member without deforming so that the flexible circuit board that is wrapped around the circumference of the extension member tightens or loosens around said member, the flexible circuit board has some degree of extra length.

SUMMARY OF THE INVENTION

The object of the present invention is to obtain a further improved image recording device.

Another object of the present invention is to obtain an image recording device in which the electrical connection between the camera body and the taking lens unit can be maintained more effectively.

In order to achieve said objects, one aspect of the present invention is an image recording device equipped with a camera body and a taking lens unit that is rotatably supported on a side of said camera body, said camera body and taking lens unit being electrically connected by means of a flexible circuit board between them, wherein said camera body and taking lens unit are electrically connected by means of slidingly connected conductive members.

Using said construction, in an image recording device in which the camera body and the taking lens unit are electrically connected by means of a flexible circuit board, the camera body and taking lens unit are electrically connected by means of slidingly connected conductive members, as a result of which the grounding line may be strengthened without increasing the size of the device, and, e.g., the generation of electromagnetic waves may be reduced.

These and other objects, advantages and features of the present invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

FIG. 4A shows the construction of said embodiment, while FIGS. 4B and 4C show variations thereof.

DETAILED DESCRIPTION OF THE PREFERRED EMBODIMENTS

One embodiment of the present invention will be explained below with reference to the drawings.

Figure 1A:
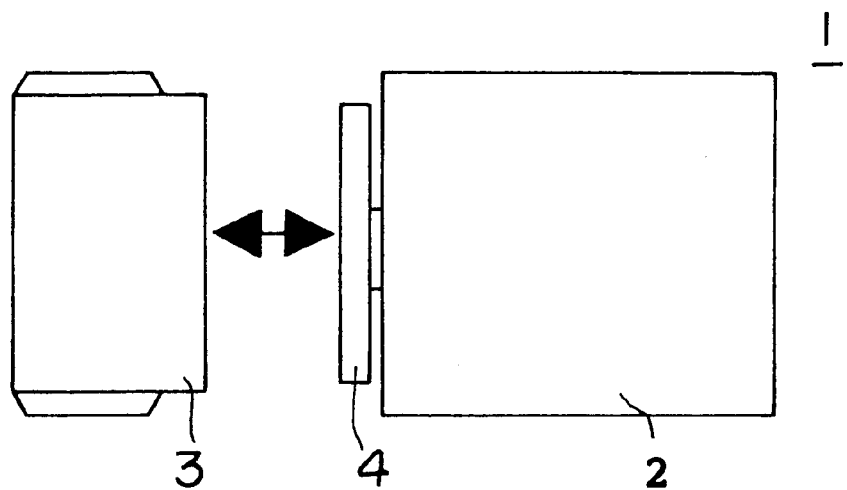
FIG. 1A shows the basic construction of one embodiment of the present invention.
Figure 1B:
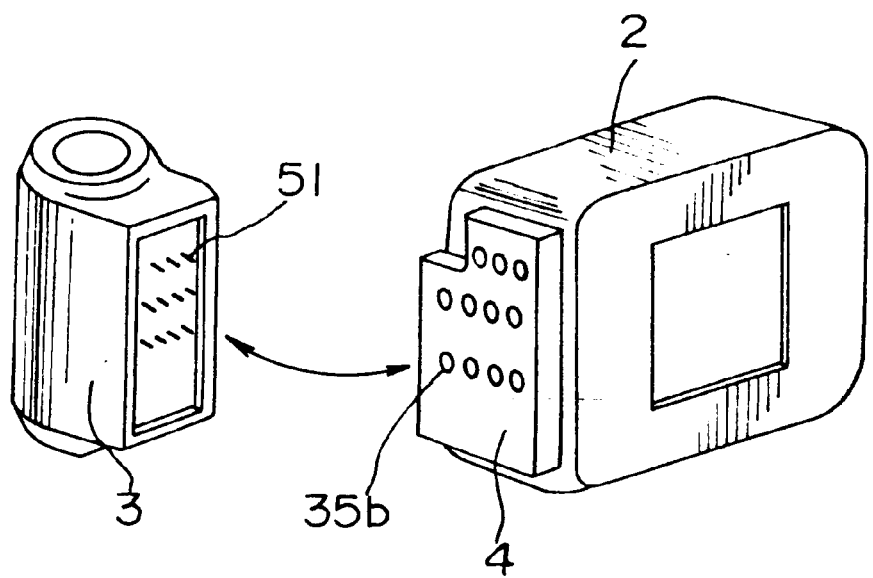
FIG. 1B is an external view of said embodiment.

FIGS. 1A and 1B are drawings showing the construction of one embodiment of the present invention.

Digital camera 1 is equipped with a camera body 2 and a taking lens unit 3 detachably mounted to the camera body 2. A connector 4 constructed in a rotatable fashion is placed on a side of the camera body 2, and the taking lens unit 3 is rotatably mounted to the camera body 2 by means of its being attached to the connector 4. Multiple openings 35*b* are formed in the connector 4, and electric connectors are located in these openings. On the other hand, connecting pins 51 are located at positions on the taking lens unit 3 corresponding to the openings 35*b*. When the taking lens unit 3 is attached to the connector 4, connecting pins 51 penetrate the openings 35*b* and come into contact with the electrical connectors.

Figure 2A:
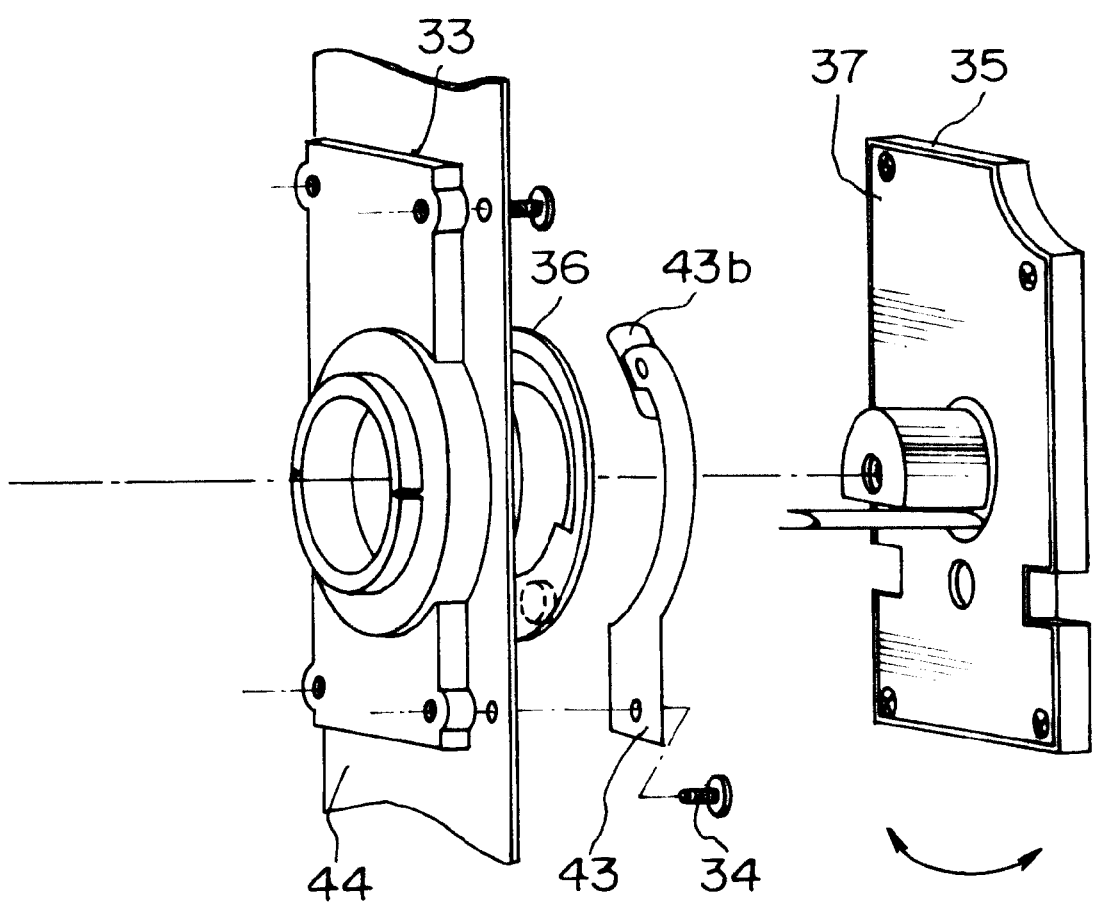
FIG. 2A is an exploded drawing showing a part of the connector of said embodiment.
Figure 2B:
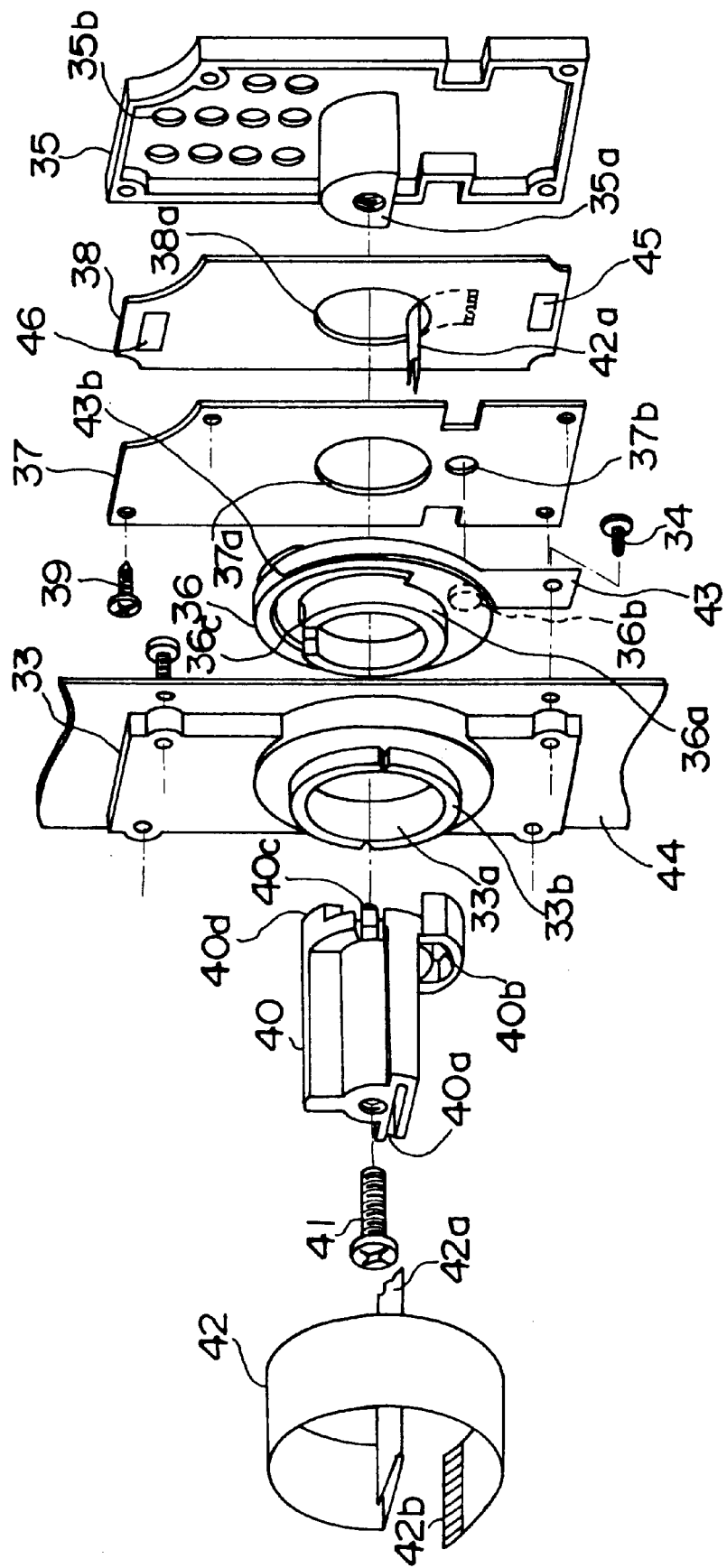
FIG. 2B is a more detailed exploded drawing showing the part of the connector shown in FIG. 2A.

FIGS. 2A and 2B are exploded perspective views showing the details of the construction of the connector 4.

A bearing plate 33 is fixed to the side surface 44 of the camera body 2 by means of screws 34, and a shaft 36*a* of a shaft member 36 is movably supported by a bushing 33*a*. A boss 35*a* that engages with the inside of the shaft member 36 and a part of which is cut away along its axis is formed on a rotating member 35. When this boss 35*a* is assembled integrally with the shaft member 36, a shaft having a linking space is formed. A reinforcing plate 37 and a circuit board 38 having electric connectors are fixed to this rotating member 35 by means of screws 39, such that an extension member 40 that is in contact with a side of the shaft member 36 that extends into the camera body and has the function of a click member is connected and fixed to the boss 35a of the rotating member 35 by means of a screw 41. As a result, the shaft member 36 and the extension member 40, which rotate, sandwich fixed the bearing plate 33 from the inside and outside.

The reinforcing plate 37 comprises a metal plate, and when it is pressed onto grounding terminal members 45 and 46 placed on the circuit board 38, the grounding line between the reinforcing plate 37 and the circuit board 38 becomes electrically conductive. A metal plate 43 having a sliding piece 43b that is movably sandwiched between the shaft member 36 and the reinforcing plate 37 is fixed to side surface 44 of the camera body 2 by means of the screw 34. Side surface 44 of the camera body 2 comprises metal and is electrically connected to the ground of the circuit board inside the camera body. Therefore, the circuit board 38 is connected to the ground inside the camera body via the reinforcing plate 37, the metal plate 43 and the body side surface 44.

The shaft member 36 is allowed to rotate relative to the bearing plate 33 within a prescribed angular range. A groove 33b and a protrusion 40b provide a clicking feel to the rotation, and a protrusion 40c provides pressure to the shaft member 36 in an outward thrusting direction. The shaft member 36 and the reinforcing plate 37 are prevented from rotating relative to each other by means of the engagement of a protrusion 36b and a hole 37b, while the shaft member 36 and the extension member 40 are prevented from rotating relative to each other by means of the engagement of a notch 36c and a protrusion 40d.

The cutout in the boss 35a forms a linking space inside the shaft 36a that connects to the extension member 40, and a notch member 40a that extends along the circumference of the extension member 40 and that connects to the linking space is formed. A flexible circuit board 42 that electrically connects the camera body 2 and the taking lens unit 3 (including the grounding line) passes through a hole 38a in the circuit board 38 and a hole 37a in the reinforcing plate 37. It further passes through the linking space inside the shaft 36a and extends in a radial fashion from the notch member 40a of the extension member 40 such that it is wrapped around the extension member 40. The tip of end part 42a of the flexible circuit board 42 is connected to the terminal of the circuit board 38 and the other end part 42b is connected to a circuit board not shown in the drawing but found inside the camera body. The electric connectors of the circuit board 38 face the openings 35b opened in the rotating member 35 such that electrical contact will be made when the taking lens unit 3 is mounted to the rotating member 35.

Figure 3A:
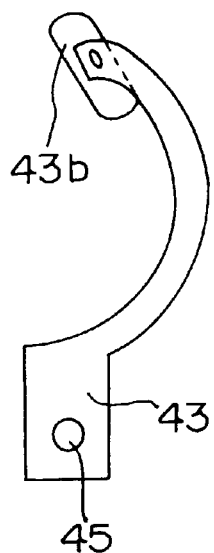
FIGS. 3A and 3B are drawings showing the construction of the metal plate forming the connector shown in FIG. 2A.
Figure 3B:

FIGS. 3A and 3B are a front elevation and side elevation, respectively, of the metal plate 43.

The sliding piece 43b is placed on one end of the metal plate 43. This portion is movably sandwiched between the shaft member 36 and the reinforcing plate 37. A hole 45 is formed on the other end of the metal plate 43, which is used to fix the metal plate 43 to side surface 44 of the camera body 2 using the screw 34.

When these components are assembled in the manner described above, the electric connectors of the circuit formed on the circuit board 38 are positioned such that they face the openings 35b in the rotating member 35. The flexible circuit board 42 extends from the circuit board 38 passes through 38a and 37a and is guided to the inside of the camera body. On the other hand, the grounding line on the circuit board 38 is connected to grounding terminals 45 and 46. Said grounding line becomes electrically connected to the reinforcing plate 37 by means of the grounding terminals 45 and 46 being pressed onto the reinforcing plate 37. Further, the sliding piece 43b of the metal plate 43 is in contact with the reinforcing plate 37, so that the metal plate 43 is connected to ground inside the camera body. Consequently, the grounding line on the circuit board 38 becomes connected to ground inside the camera body.

As shown in FIG. 2A, the rotating member 35, the circuit board 38 and the reinforcing plate 37 are assembled into a single unit, and the shaft member 36 is mounted to the unit such that it rotates in the directions indicated by arrows. When it rotates, the sliding piece 43b of the metal plate 43 moves on the surface of the reinforcing plate 37. As a result, the grounding line connection is maintained during said rotation as well. Since the grounding line connection is kept while rotation without long flexible circuit board, the grounding line becomes short, so that it is possible to reduce the generation of electromagnetic waves.

Figure 4A:
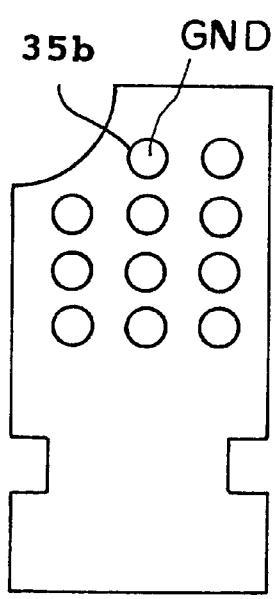
FIGS. 4A through 4C show examples of the arrangement of electrical contact points.
Figure 4B:
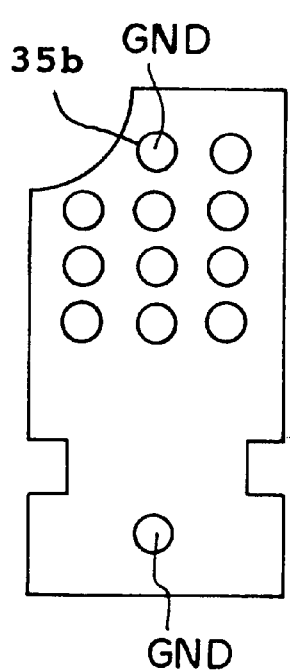
Figure 4C:
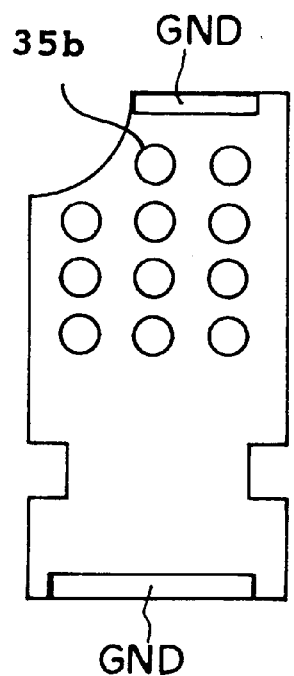

FIGS. 4A, 4B and 4C show examples of the arrangement of the electrical contact points between the taking lens unit 3 (the connecting pins) and the connector 4 (the electric connectors).

FIG. 4A shows the terminal arrangement in the embodiment described above. One of the electric connectors inside the openings 35b is grounded. FIG. 4B is an example in which a grounding terminal is added to the arrangement shown in FIG. 4A. By locating grounding terminals as if they sandwich the other electric connectors, the generation of electromagnetic waves may be further reduced. FIG. 4C shows an example in which grounding terminals are located apart from the other electric terminals such that they sandwich the electric terminals. The arrangement in FIG. 4C makes it possible to reduce the generation of electromagnetic waves to an even greater degree than in FIG. 4B.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image recording device comprising:
    a main body;
    a taking lens unit which is rotatably supported on a surface of said main body so as to be rotatable to a plurality of arbitrary positions, said image recording device being operable to record an image while said taking lens unit is located at any one of said plurality of arbitrary positions; and
    a ground connector that defines an electric ground connection between said main body and said taking lens unit, said ground connector being in contact with a conductive surface and being slidingly moveable relative to said conductive surface when relative motion between said main body and said taking lens unit occurs so as to maintain said electric ground connection between said main body and said taking lens unit during said relative motion.

2. An image recording device as stated in claim 1, wherein said electric ground connection includes a pair of metal plates, at least one of said metal plates including said conductive surface.

3. An image recording device as stated in claim 2, wherein one of said metal plates functions as a reinforcing member.

4. An image recording device as stated in claim 3, wherein said main body comprises a circuit board and said one of said metal plates that functions as a reinforcing member abuts against said circuit board.

5. An image recording device as stated in claim 4, further comprising a flexible circuit board which electrically connects said main body and said taking lens unit, said flexible circuit board being connected to said circuit board.

6. An image recording device as stated in claim 1, wherein said main body and said taking lens unit are detachably mounted with each other.

7. An image recording device as stated in claim 6, wherein said ground connector is rotatably supported on said main body.

8. An image recording device comprising:
   a body;
   a taking lens unit having an optical axis, being rotatably supported on a surface of said body, and being rotatable relative to said body about an axis substantially perpendicular to said optical axis; and
   an electric connector that defines an electric connection between said body and said taking lens unit, said electric connector being in contact with a conductive surface and being slidingly movable relative to said conductive surface when relative motion between said body and said taking lens unit occurs so as to maintain said electric connection between said body and said taking lens unit during said relative motion.

9. An image recording device as stated in claim 8, wherein said conductive surface includes a metal plate, further comprising another metal plate electrically connected to said electric connector.

10. An image recording device as stated in claim 9, wherein one of said metal plates functions as a reinforcing member.

11. An image recording device as stated in claim 10, wherein said main body comprises a circuit board and said one of said metal plates.

12. An image recording device as stated in claim 11, further comprising a flexible circuit board which electrically connects said main body and said taking lens unit, said flexible circuit board being connected to said circuit board.

13. An image recording device as stated in claim 8, wherein said main body and said taking lens unit are detachably mounted with each other.

14. An image recording device as stated in claim 13, wherein said electric connector is rotatably supported on said main body.

15. An image recording device as stated in claim 1, further comprising a flexible circuit board which electrically connects said main body and said taking lens unit.

16. An image recording device as stated in claim 8, further comprising a flexible circuit board which electrically connects said main body and said taking lens unit.

17. An image recording unit comprising:
   a body;
   a taking lens unit rotatably connected to said body such that said taking lens unit is rotatable about a rotation axis non-coincident with an optical axis of said taking lens unit; and
   a conductive connector attached to one of said body and said taking lens unit so as to rotate with one of said body and said taking lens unit, said conductive connector being in contact with a conductive surface of the other of said body and said taking lens unit, said conductive connector sliding relative to said conductive surface when said taking lens unit is rotated.

18. The image recording device as stated in claim 17, wherein said conductive surface includes a flat metal plate, said flat metal plate being part of said taking lens unit.

19. The image recording device as stated in claim 17, wherein said conductive connector is attached to a conductive member of said body.

20. The image recording device as stated in claim 17, wherein said body includes a plurality of conductive openings, and wherein said taking lens unit includes a plurality of conductive pins that are received by a plurality of conductive openings in said body.

21. The image recording device as stated in claim 17, wherein said conductive connector includes a metal plate having a protruding piece that contacts said conductive surface.

22. The image recording device as stated in claim 17, wherein said conductive connector is sandwiched between two metal plates, one of said metal plates having said conductive surface.

23. The image recording device as stated in claim 17, wherein said conductive connector follows an arcuate path when said taking lens unit is moved from said first position to said second position.

24. The image recording device as stated in claim 17, further comprising a flexible circuit board which electrically connects said body and said taking lens unit.

25. An image recording device comprising:
   a body;
   a taking lens unit;
   a connector for connecting said taking lens unit to said body, said connector being rotatably supported on said body;
   a flexible circuit board extending from an inside of said body to an inside of said connector; and
   a conductive member that defines a ground connection between said body and said taking lens unit, said conductive member being in contact with a conductive surface and being slidingly moveable relative to said conductive surface when relative motion between said body and said taking lens unit occurs.

26. The image recording device as stated in claim 25, wherein said ground connection includes a pair of conductive plates that sandwich said conductive member, one of said conductive plates having said conductive surface.

27. The image recording device as stated in claim 25, wherein said connector and said taking lens unit each include a plurality of electrical connectors for establishing multiple and separate electrical connections between said taking lens unit and said connector.

28. An image recording device comprising:
   a body;
   a taking lens unit which is rotatably supported on a surface of said body; and
   a ground connector that defines an electric ground connection between said body and said taking lens unit, said ground connector being in contact with a conductive surface and being slidingly moveable relative to said conductive surface when relative motion between said body and said taking lens unit occurs so as to maintain said electric ground connection between said body and said taking lens unit throughout the entire range of relative motion between said body and said taking lens unit.

* * * * *